(12) United States Patent
Gehlsen et al.

(10) Patent No.: US 6,177,190 B1
(45) Date of Patent: Jan. 23, 2001

(54) RADIATION CURABLE POLY(1-ALKENE) BASED PRESSURE-SENSITIVE ADHESIVES

(75) Inventors: Mark David Gehlsen, Eagan, MN (US); Chad Everett Brown, Chicago, IL (US); Patrick Darby Hyde, Burnsville, MN (US); Eugene Gregory Joseph, Vadnais Heights, MN (US); Vasant Venugopal Kolpe, Mendota Heights, MN (US)

(73) Assignee: 3M Innovative Properties Company, Saint Paul, MN (US)

( * ) Notice: Under 35 U.S.C. 154(b), the term of this patent shall be extended for 0 days.

(21) Appl. No.: 09/087,611

(22) Filed: May 29, 1998

(51) Int. Cl.$^7$ ..................................................... B32B 7/12
(52) U.S. Cl. .................................. 428/355 EN; 522/112; 522/157; 522/158; 522/160; 522/161
(58) Field of Search ....................... 428/354, 355, 428/355 EN; 522/112, 157, 158, 160, 161

(56) References Cited

U.S. PATENT DOCUMENTS

| | | | |
|---|---|---|---|
| 3,565,985 | 2/1971 | Schrenk et al. | 264/171 |
| 3,630,980 | 12/1971 | Russell et al. | 260/27 |
| 3,850,858 | 11/1974 | Park et al. | 260/27 |
| 4,022,728 | 5/1977 | Trotter et al. | 260/27 |
| 4,072,735 | 2/1978 | Ardemagni | 260/897 |
| 4,105,718 | 8/1978 | Weemes et al. | 260/889 |
| 4,181,752 | 1/1980 | Martens et al. | 427/54.1 |
| 4,217,428 | 8/1980 | McConnell et al. | 525/191 |
| 4,259,470 | * 3/1981 | Trotter | 428/355 |
| 4,329,384 | 5/1982 | Vesley et al. | 428/40 |
| 4,332,655 | 6/1982 | Berejka | 204/159.2 |
| 5,112,882 | 5/1992 | Babu et al. | 522/158 |
| 5,354,619 | 10/1994 | Babu | 428/462 |
| 5,407,970 | 4/1995 | Peterson et al. | 522/33 |
| 5,427,842 | 6/1995 | Bland et al. | 428/213 |
| 5,589,122 | 12/1996 | Leonard et al. | 264/146 |
| 5,599,602 | 2/1997 | Leonard et al. | 428/56 |
| 5,644,007 | 7/1997 | Davidson et al. | 526/64 |
| 5,660,922 | 8/1997 | Herridge et al. | 428/214 |
| 5,688,589 | * 11/1997 | Schacht . | |
| 5,723,546 | 3/1998 | Sustic | 525/240 |
| 5,859,088 | * 1/1999 | Peterson . | |

FOREIGN PATENT DOCUMENTS

| | | |
|---|---|---|
| 0 620 258 A2 | 4/1994 | (EP) . |
| WO 93 11184 | 6/1993 | (WO) . |
| 96 07674 | 3/1996 | (WO) . |
| 96 25469 | 8/1996 | (WO) . |
| 96 37568 | 11/1996 | (WO) . |
| 97 23577 | 7/1997 | (WO) . |
| WO 97 48777 | 12/1997 | (WO) . |
| WO 98 23699 | 6/1998 | (WO) . |

OTHER PUBLICATIONS

Barrett, A.E., and Miller, R. A., Extending Styrenic Block Copolymers With Amorphous Polyolefins, TECHNotes: Hot Melts, Adhesives Age, Aug. 1995, pp. 28–34.

Robe, G. R., Amorphous Polyolefins As Ingredients in Pressure–Sensitive Adhesives, 1992 TAPPI Hot Melt Symposium, pp. 1–12.

(List continued on next page.)

Primary Examiner—Terrel Morris
Assistant Examiner—Sharmistha Gupta
(74) Attorney, Agent, or Firm—Melanie Gover (57) ABSTRACT

The present invention relates to pressure-sensitive adhesive compositions. The compositions comprise a poly(1-alkene) pressure-sensitive adhesive component, a non-pressure-sensitive adhesive component, and a radiation-activatable curing agent. The invention further provides pressure-sensitive adhesive tapes and methods for making the compositions and tapes.

20 Claims, 2 Drawing Sheets

OTHER PUBLICATIONS

Barrett, A. E. and Miller, R. A., Amorphous Polyolefins as Extenders for Styrenic Block Copolymers in Hot Melt Formulations, 1995 TAPPI Hot Melt Symposium, pp. 169–183.

Clauss, M., Earhart, J. J., Stabilization Of Amorphous Poly–Alpha Olefin(Apao) Based Hot Melt Adhesives, 1995 Hot Melt Symposium, pp. 151–159.

Test Methods for Pressure Sensitive adhesives Tapes, Test Methods, 1994, 11$^{th}$ Edition, pp. 1–37.

Standard Practice for Dilute Solution Viscosity of Polymers, Designation: D 2857–95, pp. 150–154.

Krishnamurthy, V., Sustic A., Dynamic Mechanical Analysis of Rextac® Amorphous Polyalphaolefins (APAO) and Blends with Styrene Block Copolymers (SBCs), TAPPI 1992 Hot Melt Symposium, pp. 77–83.

* cited by examiner

RADIATION CURABLE POLY(1-ALKENE) BASED PRESSURE-SENSITIVE ADHESIVES

TECHNICAL FIELD

This invention relates to pressure-sensitive adhesive compositions, and, more particularly, to pressure-sensitive adhesive compositions formed from at least two polymeric materials at least one of which is a poly(1-alkene) based pressure-sensitive adhesive, to methods for making such pressure-sensitive adhesive compositions, and to tapes and articles including such pressure-sensitive adhesive compositions.

BACKGROUND OF THE INVENTION

Pressure-sensitive adhesive tapes are used for many diverse applications including, for example, marking, holding, protecting, sealing and masking purposes. These tapes comprise a backing, or other substrate, and a pressure-sensitive adhesive. Pressure-sensitive adhesives used in pressure-sensitive adhesive tapes generally adhere with no more than applied finger pressure and often stay tacky for months or years. Pressure-sensitive adhesives exert a strong holding force and should be removable from a smooth surface without leaving a residue.

In the medical field, pressure-sensitive adhesive tapes may be used, for example, to secure a wound dressing or to restrict movement of a joint or limb. It is important that the pressure-sensitive adhesive tape adhere well to skin without causing skin damage on removal.

Electrical tapes typically comprise a pressure-sensitive adhesive applied to a plasticized polyvinyl chloride backing or a polyethylene or rubber film backing. Electrical tape is used to insulate, hold, reinforce and protect electrical wires. Other uses include identifying wires in electrical circuitry, and protecting terminals during manufacture of electrical circuit boards.

Packaging applications require a large variety of tapes for uses such as closing packages, protecting labels, sealing packages from moisture, and strapping and bundling loose parts. Packaging tapes are subjected to continuous shear and low angle peel forces. Generally, if the adhesive mass is of low cohesive strength, it fails in shear; if the shear resistance is improved by adding firmness to the adhesive, it has a tendency to be less tacky and fail adhesively.

Pressure-sensitive adhesives require a delicate balance of viscous and elastic properties which result in a four-fold balance of adhesion, cohesion, stretchiness and elasticity. Pressure-sensitive adhesives generally comprise polymers that are inherently tacky or polymers that are tackified by the addition of tackifying resins.

Major classes of pressure-sensitive adhesives include tackified natural rubbers; synthetic rubbers such as butyl rubber; and tackified linear, radial, star, branched and tapered block copolymers such as styrene-butadiene, styrene-ethylene/butylene and styrene-isoprene; polyvinyl ethers; acrylics, especially those having long chain alkyl groups; poly(1-alkene)s (also referred to as poly-α-olefins); and silicones.

Polyolefin catalyst systems (i.e., Ziegler-Natta (ZN) and metallocene) have made it possible to synthesize high molecular weight poly(1-alkene) pressure-sensitive adhesives including homopolymers of $C_6$ to $C_{10}$ poly(1-alkenes).

Another type of poly(1-alkene) material, by-products of isotactic polypropylene that are described as atactic copolymers of $C_3$–$C_6$ and $C_3$–$C_8$ with molecular weights up to 50,000, have found uses as hot melt adhesives. These copolymers also make pressure-sensitive adhesives when mixed with tackifiers.

Pressure-sensitive adhesives comprising blends of poly (1-alkenes) and flow-control agents are used to protect surfaces such as automobile paint finishes and may be removed without leaving residue.

Radiation crosslinking of poly(1-alkene) homopolymer or copolymer compositions (both Ziegler Natta-catalyzed and metallocene-catalyzed) has been accomplished.

SUMMARY OF THE INVENTION

The present invention provides a radiation-curable pressure-sensitive adhesive composition, comprising:

(a) a pressure-sensitive adhesive component comprising at least one poly(1-alkene);

(b) about 2 to about 100 parts by weight, based on 100 parts by weight of said pressure-sensitive adhesive component, of a polymer component comprising at least one non-pressure-sensitive adhesive polymer having reactive sites for crosslinking; and (c) a sufficient amount of at least one crosslinking agent to crosslink (a) and (b) to provide on curing a crosslinked pressure-sensitive adhesive composition with (i) shear strength at least 300% greater than, and peel adhesion not less than 80% of, that of a crosslinked composition consisting essentially of the reaction product of components (a) and (c), or with (ii) shear strength and peel adhesion each not less than 80% of those of a crosslinked composition consisting essentially of components (a) and (c) produced under (1) the same cure conditions including the same curing energy dose, except at a process speed that is at least 100% faster than the process speed for producing the crosslinked reaction product consisting essentially of components (a) and (c) or (2) the same process speed, but with cure conditions comprising a curing energy dosage that is at least 50% less than the curing energy dosage for producing the crosslinked reaction product consisting essentially of components (a) and (c). Optionally, the composition may further comprise tackifiers and/or other additives such as plasticizers and fillers.

Certain pressure-sensitive adhesive compositions according to the present invention will not necessarily have all of the beneficial physical properties defined in the previous paragraph. Such pressure-sensitive adhesive compositions may be further defined as radiation curable pressure-sensitive adhesive compositions comprising (a) a pressure-sensitive adhesive component comprising at least one poly (1-alkene) with an inherent viscosity of at least about 0.4 deciliters/gram (dL/g), (b) from about 2 to about 100 parts by weight, per 100 parts of the pressure-sensitive adhesive component, of a polymer component comprising at least one non-pressure-sensitive polymer having (i) a G' of at least about $5 \times 10^6$ dynes/cm$^2$ at 1 Hz and at the use temperature, and (ii) a tertiary carbon content of about 1 to about 50 mole percent, based on the total moles of the polymer component, provided that if the tertiary carbon content of the polymer component is about 1 to about 10 mole percent, the shear viscosity of the polymer component is greater than about 500 Pa-s at 175° C., and (c) a radiation activatable crosslinking agent. Optionally, the pressure-sensitive adhesive composition may further comprise tackifiers and/or other additives.

Further provided is a method of making a radiation crosslinkable pressure-sensitive adhesive composition comprising melt mixing (i) a pressure-sensitive adhesive component having at least one poly(1-alkene) with an inherent viscosity greater than about 0.4 dL/g, (ii) about 2 to about 100 parts by weight, per 100 parts of said pressure-sensitive adhesive component, of a polymer component comprising at least one non-pressure-sensitive polymer having a G' of at least about $5 \times 10^6$ dynes/cm$^2$ at 1 Hz at the use temperature and having a tertiary carbon content of about 1 to about 50 mole percent, based on the total moles of the polymer component, provided that if the tertiary carbon mole percent is from about 1 to about 10 mole percent, the polymer component has a shear viscosity greater than about 500 Pa-s at 175° C., and (iii) a radiation activatable crosslinking agent. A pressure-sensitive adhesive article can be made by (1) forming said composition into a shaped article, and (2) cooling, if needed, the shaped article. The shaped article may be a pressure-sensitive adhesive suitable for subsequent lamination to a surface or may be a pressure-sensitive adhesive layer on a substrate. The radiation crosslinkable pressure-sensitive adhesive may be exposed to radiation to create a partially or fully radiation crosslinked pressure-sensitive adhesive.

The method may be used to make poly(1-alkene) pressure-sensitive adhesives having improved shear properties and approximately equivalent peel properties, compared to poly(1-alkene) pressure-sensitive adhesives not containing the polymer component. Alternatively, the method may be used to make, with less radiation exposure, pressure-sensitive adhesives having peel properties and shear properties equivalent to poly(1-alkene) pressure-sensitive adhesives not containing the polymer component. The reduction in radiation exposure may be realized by lowering the radiation dose to which the pressure-sensitive adhesive composition is exposed, shortening the process line, or increasing the speed of the process line.

The present invention further provides articles such as pressure-sensitive adhesive tapes or sheets and double-coated pressure-sensitive adhesive tapes or sheets made by extrusion or coextrusion methods.

In this description:

"crosslinked" means a connection formed within or between one or more polymer molecules wherein the connection is a covalent bond resulting from a chemical reaction.

"elastic shear modulus" or "G'" means a coefficient of elasticity for a material representing the ratio of shear stress to shear strain as the material is deformed under a dynamic load as further described herein; it is a measure of the softness or stiffness of the material;

"inherent viscosity" means the viscosity of a material as determined by ASTM D2857-93;

"polymer component" or "non-pressure-sensitive polymer component" means one or more polymer(s) comprising at least one non-pressure sensitive polymer component;

"shear value" or "shear strength" means the time required for a given downward force to remove a pressure-sensitive adhesive tape from a vertical substrate at a given temperature, as determined by methods described herein;

"peel adhesion" or "peel strength" means the given force to remove a pressure-sensitive adhesive tape from a substrate at a given temperature, angle, rate, and tape width, as determined by methods described herein;

"poly(1-alkene)" or "poly-α-olefin" means a polymer prepared by polymerization of at least one 1-alkene monomer; a 1-alkene, or alpha-olefin monomer, is a hydrocarbon having a double bond between the first and second carbon atoms;

"use temperature" means the temperature that a pressure-sensitive adhesive composition experiences during its use;

"shear viscosity" or "melt viscosity" means the ratio of shear stress to strain rate, as determined by test methods described herein, on a material at a given temperature and shear rate; it is arbitrarily measured at 175° C. and 100 s$^{-1}$ although the actual temperature to which the material is exposed during melt-processing may be higher or lower.

The radiation-crosslinked pressure-sensitive adhesives of the invention provides the advantage of surprisingly high shear properties (up to over 10,000 minutes) with decreases in peel adhesion of as little as 10% or less compared to crosslinked pressure-sensitive adhesives of similar compositions (tested at the same shear rate) that do not contain the polymer component of the invention. Shear values of up to five times that of ultraviolet crosslinked poly(1-alkene) pressure-sensitive adhesives not containing the polymer component have been observed with no corresponding decrease in peel adhesion at room temperature (25° C.). In addition, the present invention provides the advantage of having the option of producing pressure-sensitive adhesive compositions having peel and shear properties equivalent to those of ultraviolet crosslinked poly(1-alkene) pressure-sensitive adhesives not containing the polymer component by only exposing the pressure-sensitive adhesive compositions of the invention to approximately 25% of the ultraviolet light irradiation that would be used to produce the adhesive not containing the polymer component. If the irradiation intensity is not reduced, as much as a four-fold increase in line speed may be achieved.

A further advantage of the method of making a pressure-sensitive adhesive composition disclosed in this invention is that no solvent is required for the process which, among other things, eliminates the need for a solvent coater. Other advantages include the small amount of residuals produces in making the compositions of the invention and the ability to recycle poly(1-alkene) products.

DETAILED DESCRIPTION

The present invention relates to radiation crosslinkable pressure-sensitive adhesive compositions generally comprising a poly(1-alkene) pressure-sensitive adhesive component, a non-pressure-sensitive adhesive polymer component able to crosslink with the pressure-sensitive adhesive component, and radiation-activatable crosslinking agent(s).

The pressure-sensitive adhesive composition is generally made in a melt-mix process wherein the poly(1-alkene) component is mixed with the polymer component in a molten or softened state along with a crosslinking agent and any additional additives such as tackifier. Mixing may be done by any method that results in a substantially homogeneous distribution of the components. After mixing, the pressure-sensitive adhesive composition may be formed into coatings or layers by extrusion methods using batch or continuous process methods. The coatings may be solidified by quenching using direct methods such as chill rolls or water baths and indirect methods such as air or gas impingement. The pressure-sensitive adhesive composition may alternatively be formed into other shapes. The composition may remain uncured or may be partially or completely cured by exposure to radiation. The composition may be partially or totally cured before or after it is formed into its final shape.

Poly(1-alkene) Pressure-Sensitive Adhesive Component ("Poly(1-alkene) Component")

One component of the radiation crosslinkable pressure-sensitive adhesive composition of the invention is itself a pressure-sensitive adhesive comprising one or more poly(1-alkene)s.

A suitable poly(1-alkene) has a glass transition temperature ($T_g$) preferably in the range of $-70°$ C. to $0°$ C., more preferably in the range of $-60°$ C. to $-20°$ C., and an average inherent viscosity in the range of 0.4 dL/g to 9.0 dL/g, preferably in the range of 0.5 dL/g to 6.0 dL/g, and more preferably in the range of 1.5 dL/g to 4.0 dL/g as determined using a Number 50 Cannon-Fenske Viscometer tube, with a 0.1 g/dL solution of polymer in toluene, at $27°$ C. The ranges of inherent viscosity should provide a poly(1-alkene) polymer that is soft enough to be melt processed.

An inherent viscosity above these values may result in a polymer that is difficult to melt process. An inherent viscosity below the above-stated values may cause the pressure-sensitive adhesive composition to cohesively fracture and leave a residue when removed. Crosslinking the pressure-sensitive adhesive composition may extend the lower range of acceptable inherent viscosity for the poly(1-alkene) component beyond that which is acceptable for an uncrosslinked poly(1-alkene). Number average molecular weights of the uncrosslinked poly(1-alkene) polymers are preferably in the range of 5,000 to 50,000,000, more preferably 50,000 to 5,000,000.

Useful poly(1-alkene)s include, for example, non-crystalline polymers such as $C_5$ to $C_{12}$ poly(1-alkene) homopolymers and copolymers, including copolymers with $C_3$; more preferably $C_6$ to $C_{10}$ poly(1-alkene) homopolymers and copolymers, including copolymers with $C_3$; most preferably $C_6$ to $C_8$ poly(1-alkene) homopolymers and copolymers, including copolymers with $C_3$. Particularly useful poly(1-alkene)s are poly(1-hexene) and poly(1-octene), described in U.S. Pat. No. 5,644,007 (Davidson, et al), incorporated herein by reference. Another group of useful poly(1-alkene)s is those that have pendent groups susceptible to crosslinking and have been obtained either through copolymerization, as described in U.S. Pat. No. 5,112,882 (Babu, et al), incorporated herein by reference, or through chemical modification, as described in U.S. Pat. No. 5,407,970 (Babu, et al), incorporated herein by reference.

Useful poly(1-alkene)s are generally self-tacky or made tacky by adding a tackifier miscible in the poly(1-alkene). Tackifier may also be added to a self-tacky polymer to augment pressure-sensitive adhesive properties such as peel adhesion and tack. Tackifiers often lower the viscosity of a polymer and thus may be used to make the polymer more suitable for hot melt processing.

Hydrocarbon tackifiers are preferred for use in the pressure-sensitive adhesive compositions of the present invention. Useful tackifying resins include resins derived by polymerization of the following: $C_5$ to $C_9$ unsaturated hydrocarbon monomers, polyterpenes, synthetic polyterpenes, and the like. Examples of useful commercially available tackifying resins are those available under the trade names WINGTACK™ 95 and WINGTACK™ 115 from Goodyear Tire and Rubber Co., Akron, Ohio. Other useful hydrocarbon tackifier resins are available under the trade names REGALREZ™ 1078 and REGALREZ™ 1126 from Hercules Chemical Co., Wilmington, Del., and under the trade names ARKON™ P90 and ARKON™ P115 from Arakawa Chemical Co. (USA), Chicago, Ill.

The tackifier may be ethylenically unsaturated; however, saturated tackifiers are preferred for those applications where oxidation resistance is important. The total amount of tackifying resin in the poly(1-alkene) component preferably is from 0 to 150 parts by weight, more preferably 5 to 50 parts by weight, and most preferably 25 to 35 parts by weight, per 100 parts of the poly(1-alkene) component.

Non-Pressure-Sensitive Adhesive Polymer Component ("Polymer Component")

A second component of the radiation crosslinkable pressure-sensitive adhesive compositions of the present invention is a non-pressure-sensitive adhesive polymer component that may be crosslinked with the pressure-sensitive adhesive component. That is, this component contains at least one polymer that lacks one or more physical characteristics which a pressure-sensitive adhesive requires to be so designated. Typically this polymer component is a melt processable organic polymeric material. The polymer component preferably has a G' of at least about $5 \times 10^6$ dynes/cm$^2$ at 1 Hz at the use temperature and a multiplicity of reaction sites for crosslinking.

The improved peel and shear properties of the pressure-sensitive adhesive composition of this invention are a direct result of the addition of the polymer component when added in an appropriate amount. If the weight ratio of the polymer component to the poly(1-alkene) component is substantially greater than 1:1, the peel and shear strengths of the composition are typically detrimentally effected. The tolerated concentration of the polymer component may be increased by adding plasticizers and/or tackifying materials to the pressure-sensitive adhesive composition. The effective concentration of the polymer component depends on the specific types, concentrations, and characteristics of the polymer(s) in the polymer component and of each of the other components used in the pressure-sensitive adhesive composition. The amount of polymer component in the pressure-sensitive adhesive composition may vary from about 2 to about 100 parts by weight, and preferably from about 8 to about 60 parts, per 100 parts of the poly(1-alkene) component.

The polymer component preferably has sufficient viscoelastic characteristics to impart in the pressure-sensitive adhesive composition satisfactory cohesive strength to avoid splitting of the adhesive mass upon removal. That is, the cohesive strength of the resultant adhesive mass preferably is higher than the bond strength between the adhesive and the adherend. Generally, the desirable visco-elastic characteristics may be achieved by using polymers having a shear elastic modulus, i.e., G', of greater than about $5 \times 10^6$ dynes/cm$^2$ measured at 1 Hz at the use temperature. Polymers with a G' less than this value tend to form a radiation crosslinked pressure-sensitive adhesive showing little or no improvement in shear performance over a crosslinked pressure-sensitive adhesive not containing the polymer component.

Figure 3:
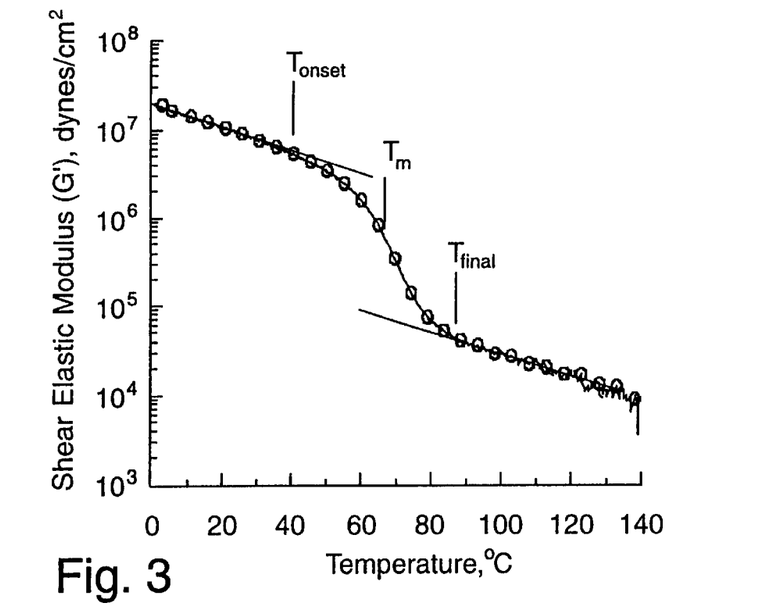
FIG. 3 is a graph of the elastic modulus (G') in dynes/cm$^2$ versus temperature in ° C. for ENGAGE™ EG8200, a poly(ethylene-octene) copolymer. It also shows the lines tangential to the melting transition section of the elastic modulus data which lines are used to determine $T_{onset}$ and $T_{final}$, which in turn are averaged to determine the melting temperature, $T_m$, of the polymer.
Figure 4:
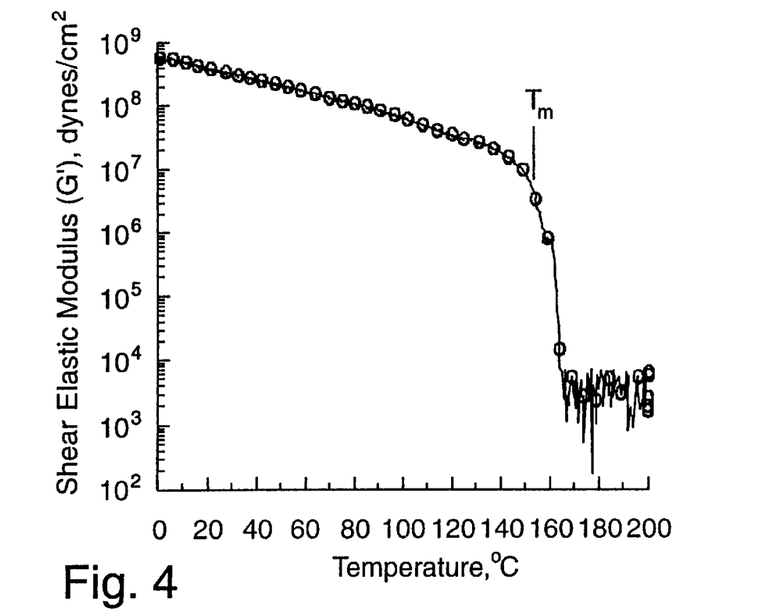
FIG. 4 is a graph of the elastic modulus (G') in dynes/cm$^2$ versus temperature in ° C. for ESCORENE™ 1024, a propylene polymer. It also shows the melting temperature of the polymer.

It should be further noted that if the use temperature approaches the melting temperature, $T_m$, of the polymer component, the polymer component may begin to melt, causing the pressure-sensitive adhesive to fail cohesively. It is recommended that the polymer component be chosen so the use temperature does not come within 10° C. of the polymer component's melting temperature. The melting temperature of a polymeric material may be determined by dynamic analysis, at a given frequency, in conjunction with the determination of G'. In the present case, $T_m$ of the polymer component was characterized using mechanical spectroscopy under the same conditions as those described herein for the determination of G'. The melting temperature was determined, from the data collected for the G' determination, by using a graph of G' versus ° C. for a polymer component. A tangential line was extended from the elastic modulus data line both above and below the melting transition portion of the elastic modulus (G') data. The points at which the data deviates from the tangent are characterized as the "onset" ($T_{onset}$) and "final" ($T_{final}$) temperatures. The $T_m$ is defined as the average of $T_{onset}$ and $T_{final}$. FIG. 3 graphically depicts this technique. FIGS. 3 and 4, respectively, show a $T_m$ close to, and distant from, the use temperature of 70° C.

The polymer component is characterized by having crosslinking sites sufficient to provide crosslinking with the poly(1-alkene). These crosslinking sites may be provided by tertiary carbon atoms in the polymer component molecule. They may also be provided by, eg., unsaturated carbon bonds. However, it should be noted that unsaturated bonds, i.e., alkenyl and aromatic bonds, tend to absorb ultraviolet (UV) radiation which may interfere with crosslinking when UV radiation is used for crosslinking. However, the presence of unsaturated bonds need not hamper the curing process. Radiation-activated crosslinking agents activated by means other than UV radiation in the absorption range of the unsaturated bonds of the polymer component may be used. Examples of such agents include those that may be activated by exposure to heat or visible irradiation, such as dicumyl peroxide subjected to thermal radiation. Determination of the most favorable activation means depends on the initiators used and on the characteristics of the specific polymer(s) used.

The experiments conducted in the present invention used a free radical initiation process to promote crosslinking. Benzophenone was used to initiate hydrogen abstraction of primary (1°), secondary (2°), or tertiary (3°) hydrogens to create free radicals. Because the bond dissociation energies and ease of abstraction are lowest for tertiary hydrogens, which are bonded to tertiary carbons, the propensity of a polymer to have crosslinking sites was estimated based on the concentration of tertiary carbons in the polymer. Other methods may also be used to estimate the concentration of crosslinkable sites.

For this invention, the desired amount of crosslinking may be achieved with a concentration of tertiary carbons ranging from approximately 1 mole percent to approximately 50 mole percent of the total moles of the polymer component, preferably from about 10 to about 50 mole percent. Radiation-crosslinked pressure-sensitive adhesives containing a polymer component with a tertiary carbon content of as little as 1 mole percent have crosslinked to provide an adhesive composition that exhibits an increase in room temperature shear performance with little or no decrease in peel adhesion when compared to similar compositions not containing the polymer component of this invention. However, below a tertiary carbon content of approximately 10 mole percent, the characteristics of the pressure-sensitive adhesive composition appear to be influenced by additional factors.

For some pressure-sensitive adhesive compositions having a tertiary carbon content of less than about 10 mole percent, the G' and the amount of crosslinkable sites do not appear to fully account for the behavior of the resulting pressure-sensitive adhesive. For some pressure-sensitive adhesives with a polymer component having a G' of $5 \times 10^6$ dynes/cm$^2$ at 1 Hz and a tertiary carbon content of less than about 10 mole percent, the performance of the pressure-sensitive adhesives may not be improved over a pressure-sensitive adhesive not containing the polymer component unless the shear viscosity of the polymer component is greater than about 500 Pa-s at 175° C. When the tertiary carbon content of the polymer component is above approximately 10 atomic percent, and its G' is at least $5 \times 10^6$ dynes/cm$^2$, a shear viscosity below about 500 Pa-s at 175° C. appears to have little or no detrimental effect on performance of the resulting pressure-sensitive adhesive.

It should be noted, however, that if the shear viscosity of the polymer component (or the pressure sensitive adhesive composition) is high enough to prevent the polymer component from mixing with the poly(1-alkene) under the given mixing conditions, the pressure sensitive adhesive properties of the resulting composition may be poor regardless of the G' and tertiary carbon content. It is preferable to have the viscosity ratio, $\eta_R$, between about 0.4 and about 2. The viscosity ratio is calculated as $\eta_D/\eta_M$ where $\eta_D$ is the melt viscosity of the dispersed phase (usually the polymer component) and $\eta_M$ is the melt viscosity of the matrix phase (usually the poly(1-alkene)). As $\eta_R$ approaches 3, it appears that poor dispersion of the dispersed phase component in the matrix component may occur and poor peel values may result.

Figure 1:
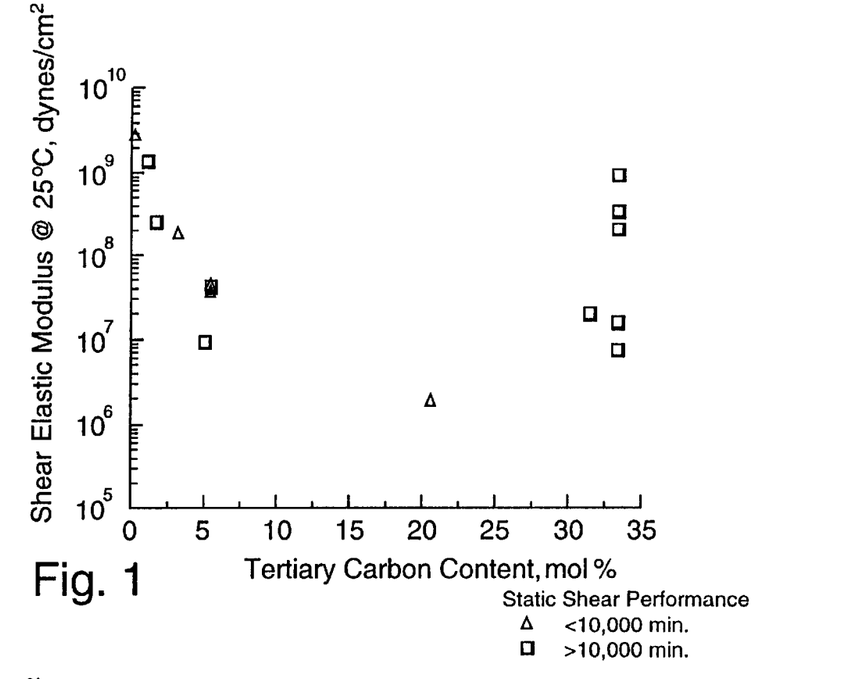
FIG. 1 is a graph which plots polymer component elastic modulus (G') in dynes/cm$^2$ against tertiary carbon mole percent (%). The triangles represent pressure sensitive adhesive compositions, containing the polymer components, which have static shear performances of less than 10,000 minutes at 25° C. The squares represent pressure sensitive adhesive compositions, containing the polymer components, which have static shear performances of greater than 10,000 minutes at 25° C.
Figure 2:
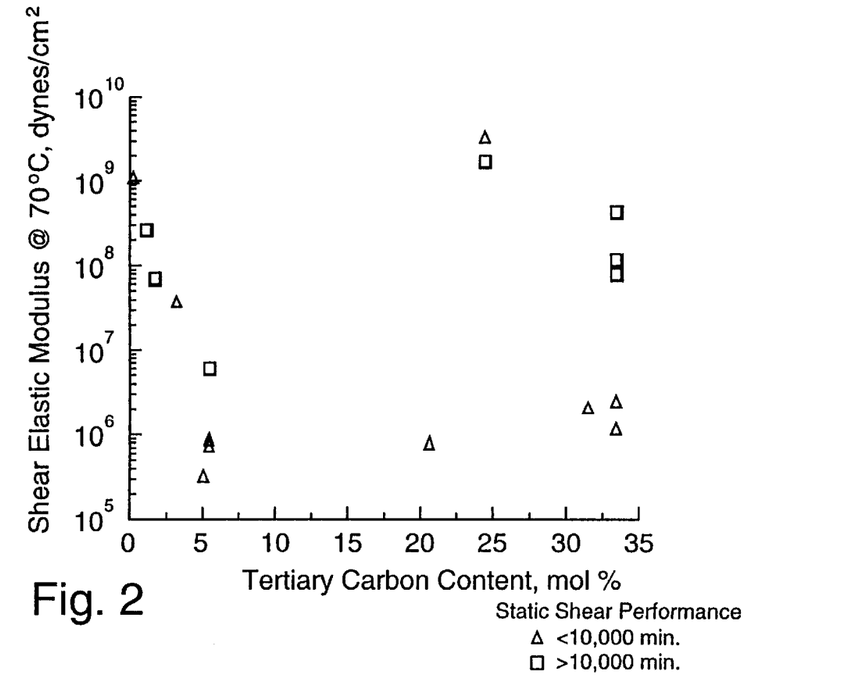
FIG. 2 is a graph which plots polymer component elastic modulus (G') in dynes/cm$^2$ against tertiary carbon mole percent (%). The triangles represent pressure sensitive adhesive compositions, containing the polymer components, which have static shear performances of less than 10,000 minutes at 70° C. The squares represent pressure sensitive adhesive compositions, containing the polymer components, which havestatic shear performances of greater than 10,000 minutes at 70° C.

Plots of G' against ° C. for polymer components are shown in FIG. 1 and FIG. 2. FIG. 1 also shows whether the pressure sensitive adhesives containing the polymer components have a static shear performance greater, or less, than 10,000 minutes at a use temperature of 25° C. FIG. 2 shows the same information for a use temperature of 70° C. As seen in FIG. 1, the shear performance of the pressure-sensitive adhesive compositions containing a polymer component having a tertiary carbon content between 1 and 35 atomic percent is generally over 10,000 minutes at 25° C. if the G' of the polymer component is greater than about $5 \times 10^6$ dynes/cm$^2$ at 1 Hz at 25° C. In FIG. 2, the shear strength of the pressure-sensitive adhesive composition containing a polymer component with a tertiary carbon content between 1 and 35 atomic percent is generally over 10,000 minutes at 70° C. if the G' of the polymer component is greater than about $5 \times 10^6$ dynes/cm$^2$ at 1 Hz at 70° C. In most cases in which the shear property was less than 10,000 minutes, the G' value at the use temperature was within approximately 10° C. of the melting temperature of the polymer component.

The polymer component may be a homopolymer or a copolymer, may be linear or branched, and may also be a mixture thereof. Suitable homopolymers include, for example, propylene, available under the trade name EASTOFLEX™ P1023 from Eastman Chemical Co., Kingsport, Tenn., and under the trade names ESCORENE™ 3505, ESCORENE™ 3445, ESCORENE™ 1024 and ACHIEVE™ 3825 from Exxon Chemical Co., Houston, Tex. Suitable copolymers include, for example, poly (ethylene-butene) available under the trade name EXACT™ 4011 from Exxon Chemical Co., Houston, Tex.; poly (ethylene-octene) available under the trade names ENGAGE™ EG8200 and AFFINITY™ PL1845 from Dow Chemical Co., Midland, Mich., poly(propylene-ethylene) available under the trade name EASTOFLEX™ 1060 from Eastman Chemical Co., Houston, Tex.; and linear low density polyethylene available under the trade name DOWLEX™ 2045 from Dow Chemical Co.; polystyrene copolymers such as poly(styrene-ethylene/butylene-styrene) available under the trade name KRATON™ G1657 from Shell Chemical Co., Houston, Tex. and poly(styrene-isoprenbe-styrene) available under the trade name KRATON™ D1107 from Shell Chemical Co.; polystyrene; polymethacrylate; and polymethylmethacrylate. The preferred homopolymers are propylene, such as that available under the trade names EASTOFLEX™ P1023 and ESCORENE™ 3505, 3445, or 1024, and copolymers such as poly(ethylene-butene) available under the trade name EXACT™ 4011; poly(ethylene-octene), available under the trade names ENGAGE™ EG8200 and AFFINITY™ PL1845, and linear low density polyethylene, available under the trade name DOWLEX™ 2045. The more preferred polymer components are the homopolymers ESCORENE™ 3445 and 1024, and copolymers such as, for example, EXACT™ 4011 and AFFINITY™ PL1845.

Crosslinking Agent

A third component of the radiation crosslinkable pressure-sensitive adhesive composition is a radiation-activatable crosslinking agent. These agents are compounds which, under the influence of activating radiation, connect polymer chains and may become incorporated therein. The activating radiation may comprise actinic (electromagnetic) or thermal radiation, including exposing dicumyl peroxide to thermal radiation to generate free radicals.

Crosslinking the components of a composition may increase the molecular weight of the individual polymer molecules in a pressure-sensitive adhesive composition and concurrently increase the composition's cohesive strength.

Suitable radiation activatable crosslinking agents include, but are not limited to: aldehydes, such as benzaldehyde, acetaldehyde, and their substituted derivatives; ketones, such as acetophenone, benzophenone, and their substituted derivatives; quinones such as the benzoquinones, anthraquinone, and their substituted derivatives; thioxanthones such as 2-isopropylthioxanthone and 2-dodecylthioxanthone; and certain chromophore-substituted vinyl halomethyl-sym-triazines such as 2,4-bis-(trichloromethyl)-6-(3',4'-dimethoxyphenyl)-sym-triazine. The concentration of radiation activatable crosslinking agent may be in the range of 0.05 to 6.0 percent by weight of the poly(1-alkene) component, preferably 0.1 to 2.0 percent by weight, and more preferably 0.15 to 0.5 percent by weight.

Other Additives

In addition, other additives such as pigments, fillers, waxes, extenders, oils, plasticizers, ultraviolet stabilizers, and antioxidants may be used in the pressure-sensitive adhesive composition. Examples of fillers include, but are not limited to, inorganic fillers such as zinc oxide, alumina trihydrate, talc, titanium dioxide, aluminum oxide, and silica. Pigments and fillers may be incorporated into the adhesive composition to manipulate the properties of the adhesive. For instance, very fine pigments may increase cohesive strength and stiffness, reduce cold flow, and reduce tack. Plate-like pigments such as mica, graphite, and talc may provide acid and chemical resistance and low gas permeability. Clays, hydrated silicas, calcium silicates, silico-aluminates, and carbon blacks may increase cohesive strength and stiffness. Plasticizers may modify the physical properties of polymer components and make them easier to process. Finally, antioxidants and ultraviolet stabilizers may be used to protect against severe environmental aging caused by ultraviolet light or heat. Antioxidants and ultraviolet stabilizers include, for example, hindered phenols, amines, and sulfur and phosphorous hydroxide decomposers.

Method of Making Pressure-Sensitive Adhesive Compositions and Articles

A pressure-sensitive adhesive composition of this invention is made by mixing a pressure-sensitive adhesive component comprising at least one poly(1-alkene) pressure-sensitive adhesive, a non-pressure-sensitive-adhesive polymer component having reactive sites for crosslinking, and a radiation activatable crosslinking agent. Solvent is not required but may be added as a carrier fluid to introduce additive components. The mixture is hot melt coated, usually onto a substrate, and may be irradiated to cause crosslinking. More than one poly(1-alkene) component, polymer component and/or crosslinking agent may be used depending on the desired properties and ultimate use of the pressure-sensitive adhesive.

Mixing may be done by any method that produces a substantially uniform distribution of the components. A substantially uniform distribution is generally indicated when any discrete phase of any one of the components has a shorter profile than a layer of the pressure-sensitive adhesive composition, for example when the pressure-sensitive adhesive composition is coated onto a substrate. A discrete phase of any one component is preferably $\frac{1}{10}^{th}$ the thickness of the pressure-sensitive adhesive composition layer, and more preferably $\frac{1}{100}^{th}$ the thickness.

The components are melt mixed in a molten or softened state using devices that provide dispersive mixing, distributive mixing, or a combination of dispersive and distributive mixing. The specific temperature used depends on the materials being mixed. Mixing methods are explained in Rauwendaal, C., *Polymer Extrusion* ($3^{rd}$ ed. 1994), Hanser Publishers, Cincinnati, Ohio. Both batch and continuous methods of blending may be used. Examples of batch machines include internal mixing apparatus available under the trade names BRABENDER™ or BANBURY™, or roll mixers. Examples of continuous methods include single screw extruding, twin screw extruding, disk extruding, reciprocating single screw extruding, and pin barrel single screw extruding. The continuous methods may include distributive elements such as cavity transfer elements available, e.g., under the trade name CTM™ from RAPRA Technology, Ltd., Shrewsbury, England, pin mixing elements, and static mixing elements as well as dispersive elements, e.g., mixing elements available under the trade names MADDOCK™ and SAXTON™.

After the hot melt mixing step, the softened or molten pressure-sensitive adhesive composition may be formed into coatings by well known batch or continuous hot melt coating techniques. An example of a batch coating process is the placement of a portion of the blended mixture between a substrate desired to be coated and a release liner, pressing this composite structure in a heated platen press, at a controlled temperature and pressure, to form a pressure-sensitive adhesive coating of a desired thickness on the substrate, and cooling the resultant coating. Continuous coating methods include, for example, extrusion and coextrusion.

The pressure-sensitive adhesive composition may be extruded onto a preformed backing to form an adhesive article. This may be done by drawing the pressure-sensitive adhesive composition out of a film die and contacting it with a moving plastic web or other suitable substrate. These methods are explained in, for example, Michaeli, W., *Extrusion Dies,* ($2^{nd}$ ed. 1992), Hanser Publishers, Munich, Germany. The extruded adhesive and the preformed backing may be nipped together. In the case of heat sensitive backings, the extruded adhesive should be allowed to cool before contacting the backing. Alternatively, adhesive articles may be prepared by laminating a preformed film of the pressure-sensitive adhesive composition to a preformed backing using heat and pressure to ensure that the adhesive and the backing bond together.

The most preferred approach is coextrusion of the layers of an adhesive article. A pressure-sensitive adhesive composition extruded from a film die may be joined with a backing material extruded from another film die with the composite material being cooled to form a pressure-sensitive adhesive tape. In this method, the pressure-sensitive adhesive composition may be applied to a moving web using a die having flexible die lips, such as a reverse orifice coating die. A source of contact dies is Extrusion Dies, Inc., Chippewa Falls, Wis. A variation of this method involves coextruding the pressure-sensitive adhesive composition, the backing, and a low adhesion backsize through either a feedblock die or a multimanifold die, such as those described in U.S. Pat. No. 3,565,985 (Schrenk); U.S. Pat. No. 5,427,842 (Bland); U.S. Pat. No. 5,589,122 (Leonard); U.S. Pat. No. 5,599,602 (Leonard); and U.S. Pat. No. 5,660,922 (Herridge). Combinations of these different manufacturing techniques may also be used such as coextruding the backing and the low adhesion backsize, then laminating the pressure-sensitive adhesive onto the backing.

Any suitable substrates may be used, including, but not limited to, natural and synthetic cloth including fiber-glass cloth, metalized films and foils, polymeric films, nonwoven materials, paper and polymer coated paper, foam backings, and micro-porous articles. Polymeric films include, but are not limited to, polyolefins such as polypropylene, polyethylene, low density polyethylene, linear low density polyethylene and high density polyethylene; polyesters such as polyethylene terephthalate; polycarbonates; cellulose acetates; polyimides available under the trade name KAPTON™ from E. I. du Pont de Nemours and Company, Wilmington, Del. Nonwoven materials, generally made from randomly oriented fibers, include, but are not limited to, nylon, polypropylene, ethylene-vinyl acetate copolymer, polyurethane, rayon and the like. Foam backings include, but are not limited to acrylic, silicone, polyurethane, polyethylene, neoprene rubber, and polypropylene, and may be filled or unfilled. Micro-porous articles include, for example, microvoided polymers and thermally-induced phase separated polymeric constructions. Backings that are layered, such as polyethylene-aluminum membrane composites, are also suitable.

After forming, the pressure-sensitive adhesive coatings are typically solidified by quenching, using direct methods, such as chill rolls or water baths, or indirect methods, such as air or gas impingement.

The composition coating or article may be exposed to activating radiation to crosslink the poly(1-alkene) and polymer components. This exposure usually occurs after the crosslinkable pressure-sensitive adhesive is applied to a substrate or release liner or after it has been transferred from a release liner to another substrate, and is usually done at room temperature. However, the pressure-sensitive adhesive may be exposed to radiation before application to the substrate if the composition is already formed into its final shape or if the crosslinked composition could still be processed into a final shape.

To achieve crosslinking, the radiation activatable crosslinking agent in the pressure-sensitive adhesive composition may be exposed to actinic (electromagnetic) radiation thereby generating free radicals which promote the crosslinking process. Commercially available actinic radiation sources include infrared, visible, and ultraviolet radiation. The use of UV radiation is explained in Hoyle and Kinstle, *Radiation Curing of Polymeric Materials,* (American Chemical Society, 1990). The preferable wavelength range to activate the radiation activatable crosslinking agents disclosed herein is 250 to 400 nm. The dose of radiant energy applied in this wavelength range is preferably less than 1500 millijoules/cm$^2$ and more preferably less than 800 millijoules/cm$^2$. Details of a radiation crosslinking process are disclosed in U.S. Pat. Nos. 4,181,752 and 4,329,384. Because the pressure-sensitive adhesive component of the present invention already contains polymers, the prepolymerization step disclosed in '752 and '384 is not required in the radiation crosslinking process of the present invention.

It is also possible to initiate crosslinking during the extrusion process by using a crosslinker that may be activated by heat, for example, a triazine compound. The heat generated to melt the polymer mixture in the extrusion process may initiate thermal crosslinking. However, conditions must be carefully controlled to ensure that the crosslinking takes place only as the material exits the extruder and not while it is still in the extruder.

Pressure-sensitive adhesive articles of the invention may comprise a layer of the pressure-sensitive adhesive composition coated on a backing which may have a releasable surface on the side opposite that coated with the pressure-sensitive adhesive. The articles may be in the form of rolls, sheets or other shapes determined by the specific use requirements. The exposed surface of the pressure-sensitive adhesive coating may subsequently be applied to a surface from which it could be later released, i.e., a release liner, or directly to the desired substrate.

Transfer articles may also be made. These articles comprise the pressure-sensitive adhesive composition between two release liners. The release liners often comprise a clear polymeric material such as polyolefin or polyester that is transparent to ultraviolet radiation. Preferably, each release liner is first coated with a release material, such as silicone, to obtain easier release from the pressure-sensitive adhesive of the invention.

The process of making the radiation-crosslinked poly(1-alkene) pressure-sensitive adhesives of this invention has several advantages over processes known to the art. Not only may one make pressure-sensitive adhesives that have excellent room temperature and elevated temperature shear properties, but one may also make radiation-crosslinked pressure-sensitive adhesives having shear and peel adhesion performance similar to known crosslinked pressure-sensitive adhesives but requiring much less radiation exposure during the curing process.

This characteristic was demonstrated when a radiation-crosslinkable poly(1-alkene) pressure-sensitive adhesive composition of the invention was exposed to only 27 percent of the radiation dose used to make a similar radiation-crosslinked poly(1-alkene) pressure-sensitive adhesive comprising the same components except not containing the polymer component used in the composition of the present invention. Comparison of the cured pressure-sensitive adhesive composition of the invention with its counterpart composition showed that shear and peel performances of the two compositions were similar. See Table 6. Thus, manufacturing lines using the method of this invention could have radiation exposure sections only one fourth the length now required. Alternatively, processes requiring radiation exposure could be operated at nearly four times the speed of current processes. Either of these benefits makes the invented method of unexpected importance and benefit.

In summary, this invention provides poly(1-alkene) containing pressure-sensitive adhesives that are cohesively strong at both room and elevated temperatures and methods of improving the properties of a pressure-sensitive adhesive by the addition of a polymer component. The invention provides pressure-sensitive adhesives that may be used to produce tapes that are substantially odor-free and physiologically inert. These tapes can be utilized in a myriad of applications including high temperature masking tapes, medical tapes, industrial tapes, and other high performance applications.

This invention is further illustrated by the following examples which are not intended to limit the scope of the invention. In the examples, all parts, ratios and percentages are by weight unless otherwise indicated. The following test methods were used to evaluate and characterize polymeric materials and the pressure-sensitive adhesive compositions produced in the examples.

EXAMPLES

Test Methods

Inherent Viscosity (IV)

Inherent viscosity was determined in accordance with ASTM Standard D2857-93, "Standard Practice for Dilute Solution Viscosity of Polymers."

Shear Viscosity ($\eta$)

Shear (or melt) viscosity ($\eta$) of the polymer component was determined in accordance with (ASTM D 2857-95) using a high pressure capillary rheometer available under the trade name RHEOGRAPH™ 2001 from Gottfert Co., Buchen, Germany, operated with a capillary die 30 mm long and 1 mm in diameter at a temperature of 175° C. unless otherwise stated. At a 100 s$^{-1}$ shear rate, the apparent shear viscosity was calculated from Poiseuille's equation and converted to true shear viscosity using the Weissenberg-Rabinovitch correction.

G'Determination

G' was determined as part of the characterization of the polymer component's viscoelastic properties. A sample of approximately 1 to 5 grams of the polymer component was placed in a Rheometrics Dynamic Analyzer (RDA) available under the trade name RHEOMETRICS™ RDA-11 from Rheometrics Scientific, Inc., Piscataway, N.J. Analysis was performed in the dynamic mode with 8 mm parallel plates. The sample temperature was controlled to within 1° C. of the test temperature using a thermally regulated nitrogen purge. The elastic modulus, G', loss modulus G", and tangent delta were determined at a frequency of 1 Hz and a strain amplitude of between 5 and 10% while heating the specimen at 1° C. per minute from 0° C. to 200° C. The values were recorded in dynes/cm$^2$ at 1 Hz and at the use temperatures of 25° C. and 70° C.

Tertiary Carbon Content

The tertiary carbon content of the polymer component was determined by using $^1$H and $^{13}$C nuclear magnetic resonance (NMR) spectra for the polymer. Approximately 100 mg of polymer was dissolved in approximately 1 ml of o-dichlorobenzene. The resulting solution was placed in a spectrometer available under the trade name UNITY™ 500 NMR Spectrometer, Model No. NMR 73809-14X, from Varian Associates, Inc., Palo Alto, Calif. The spectrometer was operated at between 110° C. and 220° C. Spectra were run using acquisition times of between 0.4 and 0.8 seconds and pulse widths of between 3.4 and 7.4 microseconds. The segment type(s) was determined from the $^1$H NMR data while the quantitative concentration of the component(s) was determined from the $^{13}$C NMR data. The total tertiary carbon content ($t_T$) was calculated using the following equation, $$t_T = \frac{c_1 \cdot t_1 + c_2 \cdot t_2}{c_1 \cdot T_1 + c_2 \cdot T_2} + \cdots \frac{c_n \cdot t_n}{c_n \cdot T_n}$$

where $t_1, t_2 \ldots t_n$ are the number of tertiary carbons in each repeat unit, $T_1, T_2 \ldots T_n$ are the total number of carbons in each repeat unit, and $c_1, c_2 \ldots c_n$ are the molar content of each repeat unit.

180° Peel Adhesion Test

Pressure-sensitive adhesive tape samples 1.25 cm wide and 15 cm long were tested for 180° peel adhesion to stainless steel. The samples were adhered to the test surfaces by rolling the tapes with a 2.1 Kg (4.5 lb.) roller using 4 passes. After aging at ambient temperatures (~22° C.) for approximately 1 hour, the tapes were tested using a slip/peel tester (Model 3M90, Instrumentors, Inc., Strongville, Ohio) in 180° geometry at 30.5 cm/min (12 in/min) peel rate. Each reported value is an average value based on the results of three samples.

Shear Strength Test

Pressure-sensitive adhesive tape samples were tested for their shear strength at 25° C. and 70° C. A 25.4 mm×25.4 mm (1.0 in×1.0 in) section of tape was adhered to a vertical stainless steel sheet with a 2.1 Kg (4.5 lb.) roller using 4 passes. After the sample aged at ambient temperatures (~22° C.) for 24 hours, a 1000 gram weight was adhered to the sample. The samples were either placed on a rack in a room at 25° C. and 50% relative humidity or in an oven set at 70° C. The amount of time it took for the weighted tape to fall off the steel sheet was recorded. The test was stopped at 10,000 minutes. Each reported value is an average value based on the results of three samples. Mode of failure was cohesive unless otherwise noted.

| | | | G' (10⁶ dynes/cm²) | | Tertiary Carbon | |
|---|---|---|---|---|---|---|
| Material | Description | ρ (g/cc) | 25° C. | 70° C. | (%) | η (Pa-s) |
| EXACT ™ 4011 | a semi-crystalline metallocene-catalyzed polyethylene/polybutylene copolymer available from Exxon Chemical Co. | 0.885 | 42 | 6 | 5.4 | 1508 |
| AFFINITY ™ PL1845 | a semi-crystalline metallocene-catalyzed polyethylene/polyoctene copolymer available from Dow Chemical Co. | 0.91 | 257 | 71 | 1.7 | 956 |
| DOWLEX ™ 2045 | a semi-crystalline Ziegler-Natta-catalyzed linear low density polyethylene/polyoctene copolymer available from Dow Chemical Co. | 0.92 | 1400 | 270 | 1.1 | 1830 |
| ACHIEVE ™ 3825 | a metallocene-catalyzed polypropylene homopolymer available from Exxon Chemical Co. | 0.90 | 971 | 424 | 33.4 | 359 |
| EASTOFLEX ™ 1023 | a self tacky amorphous polypropylene homopolymer available from Eastman Chemical Co. | 0.85 | 16 | 1 | 33.4 | 3 |
| EASTOFLEX ™ 1060 | a self tacky amorphous polypropylene/polyethylene copolymer available from Eastman Chemical Co. | 0.85 | 20 | 2 | 31.5 | 8 |
| ENGAGE ™ 8200 | a semi-crystalline metallocene-catalyzed polyethylene/polyoctene copolymer available from Dow Chemical Co. | 0.87 | 190 | 38 | 5 | 1025 |
| KRATON ™ 1657 | a styrene-ethylene/butylene-styrene di-block/tri-block copolymer available from Shell Chemical Co. | 0.90 | 21 | 20 | 10.6 | 2092 |
| KRATON ™ G1750 | a self-tacky ethylene-propylene star polymer available from Shell Chemical Co. | 0.86 | 2 | 0.8 | 20.6 | 1226 |
| PETROTHENE ™ 212-000 | a semi-crystalline high pressure Ziegler-Natta-catalyzed low density polyethylene available from Quantum Chemical Co., Cincinnati, OH. | 0.92 | 190 | 38 | 3.2 | 331 |
| KRATON ™ D1107 | a styrene-isoprene-styrene di-block/tri-block copolymer available from Shell Chemical Co. | 0.92 | 9 | 7.23 | 2.7 | 1253 |
| ESCORENE ™ 3505G | a Ziegler-Natta-catalyzed isotactic polypropylene homopolymer available from Exxon Chemical Co. | 0.90 | 8 | 2 | 33.4 | 102 |
| ESCORENE ™ 3445 | a Ziegler-Natta-catalyzed isotactic polypropylene homopolymer available from Exxon Chemical Co. | 0.90 | 210 | 78 | 33.4 | 283 |
| ESCORENE ™ 1024 | a Ziegler-Natta-catalyzed isotactic polypropylene homopolymer available from Exxon Chemical Co. | 0.90 | 350 | 120 | 33.4 | 461 |
| EXACT ™ 4038 | a semi-crystalline metallocene-catalyzed polyethylene/polybutylene copolymer available from Exxon | 0.885 | 45 | 0.9 | 5.4 | 162 |
| EXACT ™ 4023 | a semi-crystalline metallocene-catalyzed polyethylene/polybutylene copolymer available from Exxon | 0.882 | 37 | 0.7 | 5.4 | 255 |

Examples 1–8, Comparative Examples 1–3

Examples 1–8 illustrate the influence of G' and the tertiary carbon content of the polymer component on the shear and peel properties of the pressure-sensitive adhesive composition.

In Example 1, an adhesive tape comprising a pressure-sensitive adhesive composition of the invention was prepared by a melt-mixing, or melt-blending, process. A co-rotating twin screw extruder was used (Model ZSK 30, Werner-Pfleiderer, Stuttgart, Germany, having a 30 mm diameter barrel and a length to diameter ratio of 37:1. It was operated at 225 rpm resulting in operating pressures of 3.45 to 8.25 Mpa (500–1200 psi) and total flow rates of 2.7 kg/hr (6 lbs/hr)). A screw design possessing 12 zones was employed with forward kneading elements in Zones 2, 4, 6, and 8 and conveying elements in the odd numbered zones and zones 10 and 12. Each zone has a port through which materials may be added. The polymer component, EXACT™ 4011, was metered into zone 1 of the extruder using a weigh feeder at rates of 0 to 2.27 kg/hr (0 to 5 lbs/hr). The poly(1-alkene) component was fed into zone 3 of the extruder. The poly(1-alkene) component comprised a self-tacky poly(1-octene) with an inherent viscosity of 2.6 dL/g made in a manner similar to that described in U.S. Pat. No. 5,644,007, Example 3. Prior to being added to the twin screw extruder, the poly(1-alkene) component was softened in a 51 mm (2 in) single screw extruder available as Model No. 2 with Packer, Serial: B3252, from Bonnot Corp., Uniontown, Ohio, operating at 10–20 rpm and between 163° C. and 185° C.

The flow rate of the mixture of all components was controlled using a Zenith gear pump at 10–20 rpm. The feed rates of the poly(1-alkene) and polymer component were adjusted to provide a ratio of these materials of 100:25, respectively, based on a feed rate of 4.55 kg/hour (10 lbs/hour) of the poly(1-alkene) component. The temperature of the twin screw extruder increased from 149° C. to 182° C. (300° F. to 360° F.) between zone 1 and 2 of the extruder, and was maintained at 182° C. (360° F.) in the remaining zones. The melt temperature was consistent at approximately 194° C. (390° F.). At Zone 5 the following materials were added: (a) 30 parts by weight, per 100 parts of the poly(1-alkene) component (without any additives), of ARKON™ P-90 (a tackifier available from Arakawa Chemical Co. (USA), Chicago, Ill.), (b) 0.75 parts by weight, per 100 parts of the poly(1-alkene) component (without any additives), of benzophenone (a photoinitiator available from Aldrich Chemical Co., Milwaukee, Wis.), (c) 0.15 parts by weight, per 100 parts of the poly(1-alkene) component (without any additives), of IRGANOX™ 1010 (a phenolic anti-oxidant available from Ciba-Geigy, Basel, Switzerland), and (d) 0.15 parts by weight, per 100 parts of the poly(1-alkene) component (without any additives), of TINUVIN™ LD622 (an ultraviolet stabilizer available from Ciba-Geigy). These materials were pre-mixed and pre-melted at approximately 149 to 161° C. (300 to 325° F.) in a Helicon™ mixer.

The blend flowing out of the extruder was conveyed using a Zenith gear pump. A screen pack changer filter was located at the exit of the Zenith gear pump to collect any contaminants prior to coating. The twin-screw extruder was continuously discharged at a pressure of at least about 3.45 MPa (500 psi) through a 15 cm (6 inch) wide contact die. The die was maintained at about 190° C. (375° F.) and the die gap was 0.25 mm (10 mils). The blended adhesive composition was extruded at a rate of 2.7 kg/hr (6 lbs/hr) onto a 51 µm (2 mil) thick biaxially oriented polyethylene terephthalate film web, which was fed at a rate of 7.6 m/min (25 fpm) onto a casting roll maintained at 104° C. to form an adhesive coating on the web with a thickness of about 25 µm (1 mil). The coated web was wound together with a release coated paper liner to form an adhesive tape.

Part of the coated film was removed from its paper liner then passed under an ultraviolet curing lamp (Model No. 3461, Fusion Systems, Inc., Rockville, Md.) equipped with an H bulb, at 7.6 meters per minute (25 feet/min). The adhesive composition was exposed to a UV radiation dose of approximately 500 mJ/cm$^2$ at wavelength ranges of 320 to 390 nm. A light meter (UV Power Puck™, Serial 1025, available from EIT, Sterling, Va.) was used to calibrate the radiation dose. Based on the reading from the light meter, the speed of the process line was altered to ensure that the pressure-sensitive adhesive composition was exposed to about 500 mJ/cm$^2$ of radiation. All test samples were selected from the center five centimeters of the web to avoid inconsistent results that could occur due to any variation in UV dosage across the web.

Examples 2–8 were made in a manner similar to Example 1 except different polymer components were used. The polymers used as the polymer components in Examples 2–8 were AFFINITY™ 1845, DOWLEX™ 2045, ACHIEVE™ 3825, EASTOFLEX™ 1023, EASTOFLEX™ 1060, ENGAGE™ 8200 and KRATON™ 1657, respectively.

Comparative Examples C1–C3 were made in a manner similar to Example 1 except the polymer components were different. In Comparative Example 1 no polymer component was added. In Comparative Example 2 and 3, the polymer components were a poly(ethylene-propylene) available under the trade name KRATON™ 1750 from Shell Chemical Co.,and a low density polyethylene available under the trade name PETROTHENE™ 212-000 from Quantum Chemical Company, Cincinnatti, Ohio, respectively.

The pressure-sensitive adhesive tapes of the above examples were tested for 180° peel adhesion, 25° C. shear strength and 70° C. shear strength. As seen in Table 1, for the cured compositions, the room temperature (25° C.) shear properties were improved by up to approximately 6 fold and the elevated temperature (70° C.) shear properties were improved by up to approximately 28.5 fold as compared to those of a poly(1-alkene) pressure-sensitive adhesive not containing one of the polymer components of this invention. In all but two case, the attendant drop in peel properties compared to those of a poly(1-alkene) pressure-sensitive adhesive not containing one of the polymers of this invention was less than 20%.

Examples 8 and CE5 were each obtained from different process runs than the other data in Table 1( first and third, respectively). To allow direct comparison of the data, the following formula was used to normalize the data:

$$P_f^N = P_f(\text{poly}(1-\text{alkene})\text{Control, X run}) \frac{P_f(\text{poly}(1-\text{alkene})\text{Composition, Y run})}{P_f(\text{poly}(1-\text{alkene})\text{Control, Y run})}$$

where $P_f$ is the peel force value of the respective sample, $P_f^N$ is the normalized peel value for the various composition samples, X is the run for which data is being normalized, and Y is the run containing the data to which the X data will be compared after it is normalized. This normalization does not alter any conclusions but makes it easier to compare data from different process runs. The normalization is required due to fluctuations in the adhesion characteristics of the poly(1-alkene) control material (poly(1-alkene) pressure sensitive adhesive not containing a polymer component) which varied in peel force between runs while no differences in shear values were observed.

the polymer component, and the ratio of poly(1-alkene) component to polymer component was 75:25. Example 14 was made as Example 13 expect ARKON™ P-90 was added as a tackifier. The ratio of poly(1-alkene) component to polymer component to tackifier was 75:25:30. Example 15

TABLE 1

| | | G' ($10^6$ dynes/cm$^2$) | | Tertiary Carbon | Uncured | | Cured | | |
|---|---|---|---|---|---|---|---|---|---|
| | | | | | Peel N/dm | 25° C. Shear | Peel N/dm | 25° C. Shear | 70° C. Shear |
| Example | Composition | 25° C. | 75° C. | % | (oz/in) | minutes | (oz/in) | minutes | minutes |
| 1 | 2.6 C$_8$/EXACT4011/P-90 - 100/25/30 | 42 | 6 | 5.4 | 48.6 (44.4) | 32 | 27.2 (24.8) | 10000+ | 10000+ |
| 2 | 2.6 C$_8$/mPE1845/P-90 - 100/25/30 | 257 | 71 | 1.7 | 49.1 (44.8) | 23 | 31.9 (29.1) | 10000+ | 10000+ |
| 3 | 2.6 C$_8$/LLDPE2045/P-90 - 100/25/30 | 1400 | 270 | 1.1 | 41.9 (38.3) | 29 | 33.7 (30.8) | 10000+ | 10000+ |
| 4 | 2.6 C$_8$/mPP3825/P-90- 100/25/30 | 971 | 424 | 33.4 | 36.7 (33.5) | 369 | 23.4 (21.4) | 10000+ | 10000+ |
| 5 | 2.6 C$_8$/P1023/P-90 - 100/25/30 | 16 | 1 | 33.4 | 43.1 (39.4) | 50 | 36.8 (33.6) | 10000+ | 314 |
| 6 | 2.6 C$_8$/E1060/P-90 - 100/25/30 | 20 | 2 | 31.5 | 45.1 (41.2) | 43 | 35.6 (32.5) | 10000+ | 441 |
| 7 | 2.6 C$_8$/mPEG8200/P-90 - 100/25/30 | 190 | 38 | 5 | 42.6 (38.9) | 29 | 34.7 (31.7) | 10000+ | 460 |
| 8 | 2.6 C$_8$/KG1657/P-90 - 100/25/30 | 21 | 20 | 10.6 | 43.0 (39.3) | 72 | 43.8 (40.0) | 10000+ | — |
| CE1 | 2.6 C$_8$/P-90 - 100/30 | — | — | | 46.1 (42.1) | 11 | 39.2 (35.8) | 1678 | 334 |
| CE2 | 2.6 C$_8$/KG1750/P-90 - 100/25/30 | 2 | 0.8 | 20.6 | 45.2 (41.3) | 24 | 34.6 (31.6) | 1305 | 262 |
| CE3 | 2.6 C$_8$/LDPE212/P-90- 100/25/30 | 190 | 38 | 3.2 | 45.3 (41.4) | 26 | 43.7 (39.9) | 875 | 351 |

Example 9–19, Comparative Example 4

Example 9–16 illustrate the influence of tackifier concentration on adhesive performance of the polymer component of the pressure-sensitive adhesive composition.

Example 9–16 were made in a manner similar to Example 1 expect different polymers, tackifier concentrations, and ratios of poly(1-alkene) component to polymer component were used in some cases. Example 9 and 10 were made in a manner similar to Example 1 except no tackifier was added and ENGAGE™ 8200 was used as the polymer component. The ratios of poly(1-alkene) component to polymer component were 90:10 and 80:20, respectively. Example 11 and 12 were made as Example 9 and 10 except ARKON™ P-90 was added as a tackifier. The ratios of poly(1-alkene) component to polymer component to tackifier were 90:10:30 and 80:20:30, respectively. Example 13 was made in a manner similar to Example 9 and 10 but with KRATON™ D1107 as was made as Example 14 except the ratio of poly(1-alkene) component to polymer component to tackifier was 50:50:30. Example 16 was made as Example 14 except the tackifier concentration was 60 parts by weight instead of 30 parts.

Comparative Example 4 was made as Example 9 except no polymer component was added. The compositions containing ENGAGE™ 8200 and KRATON™ D1107 were made during different process runs. The comparative (containing no polymer component or tackifier produced from the run that produced the 1107 data had Uncured Peel and Shear values of 21.1 N/dm and 26 minutes, respectively.

All of the uncured and some of the cured examples were tested for 180° peel adhesion and 25° C. shear strength. As seen in Table 2, for a given ratio of poly(1-alkene) component and polymer component, an increase in tackifier generally increased peel strength, but decreased shear strength.

TABLE 2

| | | Uncured | | Cured | |
|---|---|---|---|---|---|
| Example | Composition | Peel N/dm (oz/in) | 25° C. Shear minutes | Peel N/dm (oz/in) | 25° C. Shear minutes |
| 9 | 2.6 C$_8$/mPEG8200 - 90/10 | 21.2 (19.4) | 54 | — | — |
| 10 | 2.6 C$_8$/mPEG8200 - 80/20 | 18.6 (17.0) | 87 | — | — |
| 11 | 2.6 C$_8$/mPEG8200/P-90 - 90/10/30 | 46.2 (42.2) | 16 | 40.0 (36.5) | 5389 |
| 12 | 2.6 C$_8$/mPEG8200/P-90 - 80/20/30 | 42.6 (38.9) | 29 | 34.7 (31.7) | 10000+ |
| 13 | 2.6 C$_8$/KD1107 - 75/25 | 29.3 (26.8) | 136 | — | — |

TABLE 2-continued

|  |  | Uncured | | Cured | |
| --- | --- | --- | --- | --- | --- |
| Example | Composition | Peel N/dm (oz/in) | 25° C. Shear minutes | Peel N/dm (oz/in) | 25° C. Shear minutes |
| 14 | 2.6 C$_8$/KD1107/P-90 - 75/25/30 | 53.4 (48.8) | 89 | 36.2 (33.1) | 5037 |
| 15 | 2.6 C$_8$/KD1107/P-90 - 50/50/30 | 52.9 (48.3) | 252 | 30.9 (28.2) | 10000+ |
| 16 | 2.6 C$_8$/KD1107/P-90 - 75/25/60 | 75.2 (68.7) | 67 | 65.3 (59.6) | 740 |
| CE4 | 2.6 C$_8$/mPEG8200 - 100/0 | 24.4 (22.1) | 31 | — | — |

Examples 17–19 and Comparative Example 5

Examples 17–19 illustrates the polymer component concentration effect on the adhesive properties of the pressure-sensitive adhesive composition.

Examples 17–19 were made in a manner similar to Example 4 except the ratio of the poly(1-alkene) component to polymer component to tackifier were 100:4:30, 100:8:30, and 100:16:30, respectively.

Comparative Example 5 was made as Example 17 except no polymer component was added.

The uncured and cured pressure-sensitive adhesive tapes of the above examples were tested for 180° peel adhesion, 25° C. shear strength and 70° C. shear strength. As seen in Table 3, all cured examples showed at least a 4 fold increase in shear performance when compared to CE5, with no decrease in peel performance. The uncured examples showed an increase in shear performance with increasing polymer component content and a dramatic increase of 30 fold at 16 parts of polymer component, with a decrease in peel performance of 20% or less.

position. All of these polymer components had a tertiary carbon content of 33.4 mole percent.

Examples 20–23 were made in a manner similar to Example 1 except the polymer components were different. In Examples 20–23 the polymer components were ESCORENE™ 3505G, ESCORENE™ 3445, ACHIEVE™ 3825 and ESCORENE™ 1024, respectively. Comparative Example 6 was made in a manner similar to Example 20, but no polymer component was added.

The uncured and cured pressure-sensitive adhesive tapes of the above examples were tested for 180° peel adhesion, 25° C. shear strength and 70° C. shear strength. The results are reported in Table 4. The data generally shows that the shear performance for a pressure-sensitive adhesive composition with a polymer component having a G' less than $5 \times 10^6$ dynes/cm$^2$ at 1 Hz at the use temperature is several times lower than that for a pressure-sensitive adhesive composition with a polymer component having a G' greater than $5 \times 10^6$ dynes/cm$^2$ at 1 Hz at the use temperature.

TABLE 3

|  |  | Uncured | | Cured | | |
| --- | --- | --- | --- | --- | --- | --- |
| Example | Composition | Peel N/dm (oz/in) | 25° C. Shear minutes | Peel N/dm (oz/in) | 25° C. Shear minutes | 70° C. Shear minutes |
| 17 | 2.6 C$_8$/mPP3825/P-90 - 100/4/30 | 40.2 (36.7) | 27 | 29.0 (26.5) | 10000+ | 10000+ |
| 18 | 2.6 C$_8$/mPP3825/P-90 - 100/8/30 | 38.1 (34.8) | 46 | 32.9 (30.0) | 10000+ | 10000+ |
| 19 | 2.6 C$_8$/mPP3825/P-90 - 100/16/30 | 31.4 (28.7) | 463 | 28.6 (26.1) | 10000+ | 10000+ |
| CE5 | 2.6 C$_8$/P-90 - 100/30 | 37.7 (34.4) | 15 | 28.0 (25.6) | 2233 | 175 |

Examples 20–23 and Comparative Example 6

Examples 20–23 illustrate the influence of the G' of the polymer component on the pressure-sensitive adhesive com-

TABLE 4

|  |  |  |  | Uncured | | Cured | | |
| --- | --- | --- | --- | --- | --- | --- | --- | --- |
| Example | Composition | G' ($10^6$ dynes/cm$^2$) 25° C. | G' ($10^6$ dynes/cm$^2$) 70° C. | Peel N/dm (oz/in) | 25° C. Shear minutes | Peel N/dm (oz/in) | 25° C. Shear minutes | 70° C. Shear minutes |
| 20 | 2.6 C$_8$/PP3505G/P-90 - 100/25/30 | 8 | 2 | 32.7 (29.9) | 413 | 28.8 (26.3) | 10000+ | 166 |

TABLE 4-continued

| Example | Composition | G' (10⁶ dynes/cm²) 25° C. | G' (10⁶ dynes/cm²) 70° C. | Uncured Peel N/dm (oz/in) | Uncured 25° C. Shear minutes | Cured Peel N/dm (oz/in) | Cured 25° C. Shear minutes | Cured 70° C. Shear minutes |
|---|---|---|---|---|---|---|---|---|
| 21 | 2.6 C₈/PP3445/P-90 - 100/25/30 | 210 | 78 | 27.4 (25.0) | 379 | 30.9 (28.2) | 10000+ | 10000+ |
| 22 | 2.6 C₈/mPP3825/P-90 - 100/25/30 | 971 | 424 | 31.4 (28.7) | 463 | 28.6 (26.1) | 10000+ | 10000+ |
| 23 | 2.6 C₈/PP1024/P-90 - 100/25/30 | 350 | 120 | 30.0 (27.4) | 429 | 31.6 (28.9) | 10000+ | 10000+ |
| CE6 | 2.6 C₈/P-90- 100/30 | — | — | 37.7 (34.4) | 15 | 28.0 (25.6) | 2233 | 175 |

Example 24

Examples 24 and Comparative Examples 7 and 8 illustrate the influence of the shear viscosity of the polymer component on shear strength of the pressure-sensitive adhesive composition.

Example 24 and comparative examples 7 and 8 were made in a manner similar to Example 20 except the type of polymer component varied. In Example 24 and comparative examples 7 and 8, the polymer component were EXACT™ 4011, EXACT™ 4038, and EXACT™ 4023, respectively.

The pressure-sensitive adhesive tapes of the above examples were tested for 180° peel adhesion, 25° C. shear strength. As seen in Table 5, the 25° C. shear strengths of the cured compositions with high shear viscosities were much better than the compositions with low shear viscosities when comparing compositions with identical tertiary carbon contents and comparable G' values.

TABLE 5

| Ex. | Composition | G' (dynes/cm²) 25° C. | Tertiary Carbon % | Shear Viscosity Pa-S | Uncured Peel N/dm (oz/in) | Uncured 25° C. Shear min. | Cured Peel N/dm (oz/in) | Cured 25° C. Shear min. | Cured 70° C. Shear min. |
|---|---|---|---|---|---|---|---|---|---|
| 24 | 2.6 C₈/mPE4011/P-90 - 100/25/30 | 42 | 5.4 | 1508 | 42.3 (38.6) | 50 | 29.9 (27.3) | 10000+ | 10000+ |
| CE-7 | 2.6 C₈/mPE4038/P-90 - 100/25/30 | 45 | 5.4 | 162 | 36.7 (33.5) | 53 | 25.1 (22.9) | 2011 | 44 |
| CE-8 | 2.6 C₈/mPE4023/P-90 - 100/25/30 | 37 | 5.4 | 255 | 35.7 (32.6) | 55 | 29.1 (26.6) | 4822 | 78 |

Examples 25–26 and Comparative Example 9

Examples 25–26 illustrate the influence of radiation dose on shear strength.

Examples 25–26 and Comparative Example 9 were made in a manner similar to Example 3, Example 20 and Comparative Example 1, respectively, except samples of each were exposed to different doses of ultraviolet radiation as shown in Table 6.

The pressure-sensitive adhesive tapes of the above examples were tested for 180° peel adhesion and 25° C. shear strength. As seen in Table 6, pressure-sensitive adhesive compositions were obtained having higher room temperature shear properties than the control sample exposed to the same dose. In addition, compositions were obtained having shear properties similar to, or better than, those of the control, after exposure to dose rates lower than those used for the control. For example, Example 26 was exposed to a UV dosage of 150 mJ/cm² and had a shear value of 2282 minutes. This is higher than the shear value of 1678 of Control Example CE9 when it was exposed to a UV dosage of 550 mJ/cm².

When an Example was compared to a CE9 sample exposed to the same UV dosage, the Example showed an increase in shear performance of between 1.6 fold and 116 fold. The decrease in peel adhesion ranged from 11% to 29%.

TABLE 6

| Example | Composition | UV Dosage mJ/cm² | Peel N/dm (oz/in) | 25° C. Shear minutes |
|---|---|---|---|---|
| 26 | 2.6 C₈/PP3505/P-90 - 100/25/30 | 150 | 33.7 (30.8) | 2282 |
| CE9 | 2.6 C₈/P-90 - 100/30 | 183 | 37.8 (34.5) | 86 |
| 25 | 2.6 C₈/mPEG8200/P-90 - 100/25/30 | 183 | 33.9 (31.0) | 317 |
| 26 | 2.6 C₈/PP3505/P-90 - 100/25/30 | 183 | 33.7 (30.8) | 10000+ |
| CE9 | 2.6 C₈/P-90 - 100/30 | 275 | 39.9 (36.4) | 253 |
| 25 | 2.6 C₈/mPEG8200/P-90 - 100/25/30 | 275 | 31.5 (28.8) | 417 |
| 26 | 2.6 C₈/PP3505/P-90 - 100/25/30 | 275 | 31.5 (28.8) | 10000+ |
| CE9 | 2.6 C₈/P-90 - 100/30 | 550 | 39.2 (35.8) | 1678 |
| 25 | 2.6 C₈/mPEG8200/P-90 - 100/25/30 | 550 | 34.7 (31.7) | 10000+ |

TABLE 6-continued

| Example | Composition | UV Dosage mJ/cm$^2$ | Peel N/dm (oz/in) | 25° C. Shear minutes |
|---|---|---|---|---|
| 26 | 2.6 C$_8$/PP3505/P-90 - 100/25/30 | 550 | 28.0 (25.6) | 10000+ |

Example 27–29 and Comparative Example C10

Examples 27–29 illustrate the influence of a C$_6$ poly(1-alkene) pressure-sensitive adhesive used in place of a C$_8$ poly(1-alkene) pressure-sensitive adhesive.

Examples 27–29 were made in a manner similar to Example 4 except the poly(1-alkene) component was comprised of a self-tacky poly(1-hexene) with an inherent viscosity of 2.4 dL/g made in a manner similar to that described in U.S. Pat. No. 5,644,007, Example 4. In addition, the ratio of pressure-sensitive adhesive component to polymer component to tackifier were 100:5:30, 100:11:30, and 100:25:30, respectively.

Comparative Example 10 was made in a manner similar to Example 27 except no polymer component was added.

The pressure-sensitive adhesive tapes of the above examples were tested for 180° peel adhesion and 25° C. shear strength. As seen in the Table 7, shear values were improved over the comparative example, but a polymer component concentration of 25 parts per 100 parts by weight of poly(1-alkene) caused a drop in peel values.

TABLE 7

| | | Uncured | | Cured | |
|---|---|---|---|---|---|
| Example | Composition | Peel N/dm (oz/in) | 25° C. Shear minutes | Peel N/dm (oz/in) | 25° C. Shear minutes |
| 27 | 2.4 C$_6$/mPP3825/P-90 - 100/5/30 | 45.9 (41.9) | 1033 | 41.9 (38.3) | 10000+ |
| 28 | 2.4 C$_6$/mPP3825/P-90 - 100/11/30 | 41.0 (37.4) | 2467 | 38.7 (35.3) | 10000+ |
| 29 | 2.4 C$_6$/mPP3825/P-90 - 100/25/30 | 11.8 (10.8) | 3745 | 13.1 (12.0) | 10000+ |
| CE10 | 2.4 C$_6$/mPP3825/P-90 - 100/0/30 | 40.4 (36.9) | 266 | 34.7 (31.7) | 7359 |

Various modifications and alterations of this invention will become apparent to those skilled in the art without departing from the scope and spirit of the invention. It should be understood that this invention is not limited to the illustrative embodiments set forth herein.

What is claimed is:

1. A radiation-curable pressure-sensitive adhesive composition, comprising:
   (a) a pressure-sensitive adhesive component comprising at least one poly(1-alkene);
   (b) about 2 to about 100 parts by weight, per 100 parts of said pressure-sensitive adhesive component, of a polymer component comprising at least one non-pressure-sensitive adhesive polymer having reactive sites for crosslinking; and
   (c) a sufficient amount of at least one crosslinking agent to crosslink (a) and (b) to provide on curing a crosslinked pressure-sensitive adhesive composition with (i) shear strength at least 300% greater than, and peel adhesion not less than 80% of, that of a crosslinked composition consisting essentially of the reaction product of components (a) and (c), or with (ii) shear strength and peel adhesion each not less than 80% of those of a crosslinked composition consisting essentially of the reaction products of components (a) and (c) produced under (1) the same cure conditions including the same curing energy dosage, except at a process speed that is at least 100% faster than the process speed for producing the crosslinked reaction product consisting essentially of components (a) and (c), or (2) the same process speed, but with cure conditions comprising a curing energy dosage that is at least 50% less than the curing energy dosage for producing the crosslinked reaction product consisting essentially of components (a) and (c).

2. The pressure-sensitive adhesive composition of claim 1 further comprising a tackifying material.

3. The pressure-sensitive adhesive composition of claim 1 further comprising at least one additional component selected from the group consisting of pigment(s), filler(s), plasticizer(s), ultraviolet stabilizer(s), and antioxidant(s).

4. The pressure-sensitive adhesive composition of claim 1 wherein component (a) is selected from the group consisting of poly(1-octene) and poly(1-hexene).

5. The pressure-sensitive adhesive composition of claim 1 wherein component (b) is selected from the group consisting of polypropylene, poly(ethylene/butylene), poly(ethylene/octene), and linear low density polyethylene.

6. The pressure-sensitive adhesive composition of claim 1 wherein component (c) is selected from the group consisting of benzophenone and triazine compounds.

7. The radiation crosslinkable pressure-sensitive adhesive composition of claim 1 wherein components (a), (b), and (c) are poly(1-octene), poly(ethylene/butylene), and benzophenone, respectively.

8. A pressure-sensitive adhesive tape comprising a substrate having a surface which bears a coating of the pressure-sensitive adhesive composition of claim 1.

9. A pressure-sensitive adhesive tape comprising a substrate having a surface which bears a coating of a partially or fully radiation-crosslinked product of the pressure-sensitive adhesive composition of claim 1.

10. A double coated pressure-sensitive adhesive tape comprising a substrate having opposite surfaces each of which bears a coating of a pressure-sensitive adhesive composition wherein at least one of the coatings comprises the pressure-sensitive adhesive composition of claim 1.

11. A radiation curable pressure-sensitive adhesive composition, comprising:

(a) a pressure-sensitive adhesive component having at least one poly(1-alkene) with an inherent viscosity of at least about 0.4 deciliters/gram, (b) from about 2 to about 100 parts by weight, per 100 parts of said pressure-sensitive adhesive component, of a polymer component comprising at least one non-pressure-sensitive adhesive polymer having (i) a G' of at least about $5 \times 10^6$ dynes/cm$^2$ at 1 Hz and at the use temperature and (ii) a tertiary carbon content of about 1 to about 50 mole percent based on the total mole percent of the polymer component, provided that if the polymer component tertiary carbon content is from about 1 to about 10 mole percent, the polymer component has a shear viscosity greater than about 500 Pa-s at 175° C., and (c) at least one radiation activatable crosslinking agent.

12. The pressure-sensitive adhesive composition of claim 11 further comprising a tackifying material.

13. The pressure-sensitive adhesive composition of claim 11 further comprising at least one additional component selected from the group consisting of pigment(s), filler(s), plasticizer(s), ultraviolet stabilizer(s), and antioxidant(s).

14. The pressure-sensitive adhesive composition of claim 11 wherein component (a) is selected from the group consisting of poly(1-octene) and poly(1-hexene).

15. The pressure-sensitive adhesive composition of claim 11 wherein component (b) is selected from the group consisting of polypropylene, poly(ethylenelbutylene), poly (ethylene/octene), and linear low density polyethylene.

16. The pressure-sensitive adhesive composition of claim 11 wherein component (c) is selected from the group consisting of benzophenone and triazine compounds.

17. The pressure-sensitive adhesive composition of claim 11 wherein components (a), (b), and (c) are poly(1-octene), poly(ethylene/butylene), and benzophenone, respectively.

18. A pressure-sensitive adhesive tape comprising a substrate having a surface which bears a coating of the pressure-sensitive adhesive composition of claim 11.

19. A pressure-sensitive adhesive tape comprising a substrate having a surface which bears a coating of a partially or fully radiation crosslinked product of the pressure-sensitive adhesive composition of claim 11.

20. A double coated pressure-sensitive adhesive tape comprising a substrate having opposite surfaces each of which bears a coating of a pressure-sensitive adhesive composition wherein at least one of the coatings comprises the pressure-sensitive adhesive composition of claim 11.

* * * * *